Patented Mar. 3, 1925.

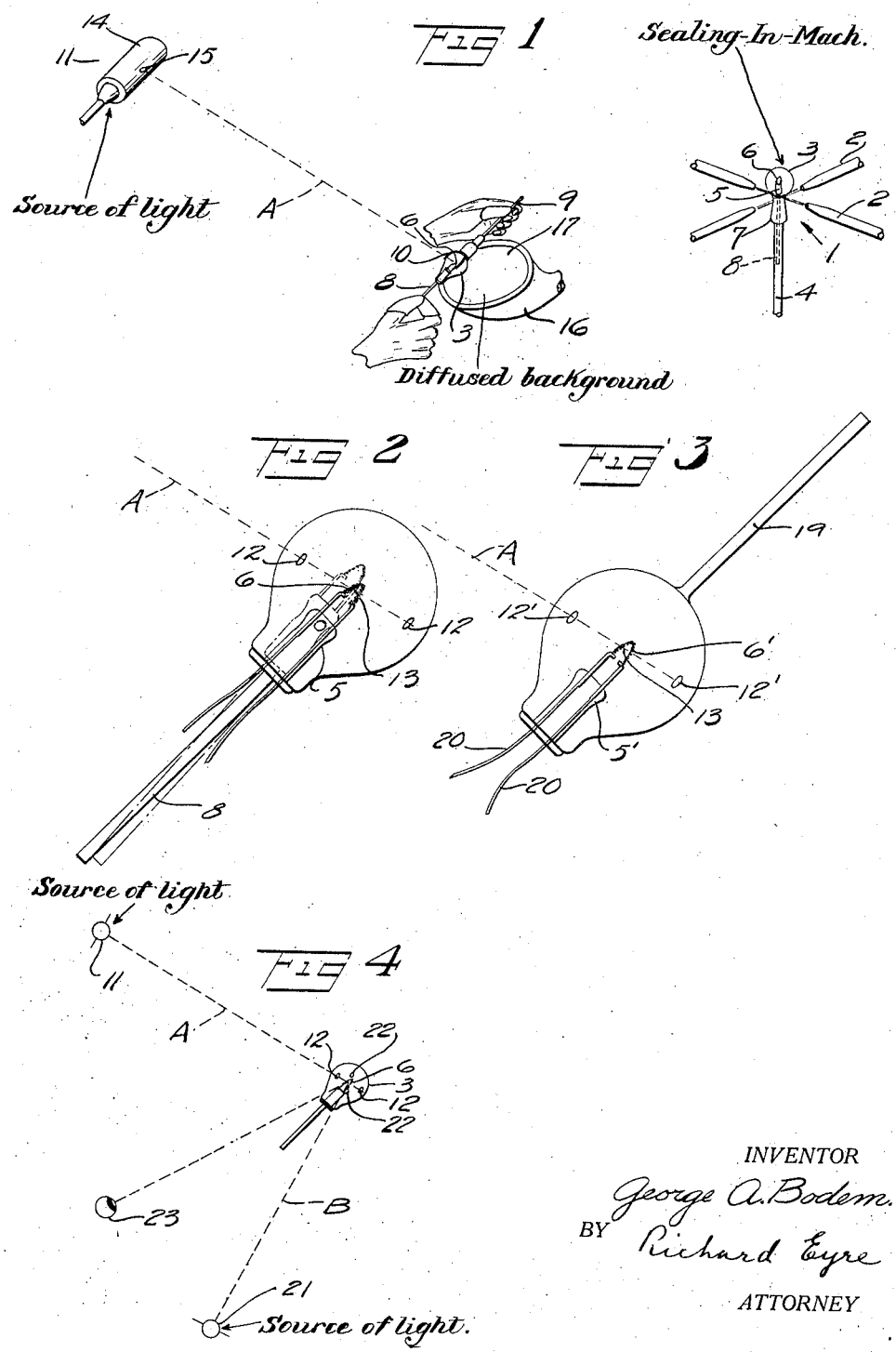

1,528,317

UNITED STATES PATENT OFFICE.

GEORGE ADAM BODEM, OF NEWARK, NEW JERSEY, ASSIGNOR TO TUNG-SOL LAMP WORKS, OF NEWARK, NEW JERSEY, A CORPORATION OF NEW JERSEY.

METHOD AND APPARATUS FOR SEALING-IN AND LOCATING FIAMENT MOUNTS IN BULBS.

Application filed May 26, 1923. Serial No. 641,600.

*To all whom it may concern:*

Be it known that I, GEORGE ADAM BODEM, a citizen of the United States, residing at and whose post-office address is 12 Shanley Avenue, Newark, Essex County, New Jersey, have invented new and useful Improvements in Methods and Apparatus for Sealing-In and Locating Filament Mounts in Bulbs, of which the following is a specification.

This invention relates to a method and apparatus for sealing in filament mounts and accurately positioning the filaments within the bulbs.

It is important in certain classes of electric incandescent lamp bulbs that the incandescent filaments be accurately mounted and positioned within the bulbs, as for example, lamps of the focusing type wherein accuracy and uniformity in the location are desirable for focusing purposes. This particularly applies to bulbs for automobile headlights wherein the facilities for focal adjustments are more or less limited, and the variations permitted as to location of the filaments in the bulbs are accordingly restricted to rather narrow limits. It was heretofore customary to check and test the lamp bulbs for filament location after the filament mounts had been sealed in with a view to discarding those lamps having filament locations outside the permissible limits of variations, and the wastage for bad filament location assumed comparatively large proportions due to the imperfect mechanical operations of mounting the filaments and sealing in the mounts. Moreover, a large percentage of the passable lamps were just within the limits, rendering focal adjustments difficult.

The object of the present invention is a novel method and apparatus whereby the position and location of the filaments may be checked during the operation of sealing the mounts within the bulbs and the mounts may be manipulated to make any corrective adjustments which may be necessary before the completion of the sealing operations, thereby avoiding the necessity for discarding lamp bulbs for bad filament location after sealing-in of the mounts and rendering the average filament location more accurate and uniform. More particularly the object of the invention is a novel method enabling the operator in charge of the mount-sealing machine to rapidly check and accurately adjust the filament location immediately upon removing the bulb from the machine while the seal is soft and before it hardens and sets sufficiently to prevent any corrective adjustments which may be desired.

To these ends I have found that the filament location of an incandescent lamp bulb may be accurately checked and tested by means of the images formed within the bulb from an external light source and particularly when the bulb is of spherical or globular shape. An external source of light causes two images to be formed in a spherical bulb which are always in line with the geometrical center of the bulb and which appear to the eye to be equally distant therefrom. These two images of the external light source may therefore be used as a gage for checking the position of the filament since any dissymmetry of the filament with reference to them is readily apparent to the eye and is a measure of its departure from the correct or central position in the bulb. This invention contemplates the use of these images as a gage to test or check the filament location and the corrective adjustments of the filament during the operation of sealing the filament mount to the bulb. In carrying out the invention the operator who feeds the lamp bulbs and the filament mounts to the sealing-in machine is provided with a source of light conveniently positioned with reference to her eye and at the final step of fusing and sealing the mount within the bulb, and while the jointure is still hot and soft, she removes the bulb from the machine to a position to receive the rays of light from the light source and observing the images which are thus formed in the globular bulb, she may make any corrective adjustments of the filament which may be necessary to bring it into symmetrical relation with the images thus formed as a gage. She may make there corrective adjustments either by manipulating the leading-in wires in the case of standard tip lamps, or the exhaust stem in case of the tipless lamps, the jointure remaining quite soft for several seconds after removal from the sealing machine, and the manipulation requiring only a very slight touch or force applied to the filament mount to change its position. The seal ordinarily cools off and sets in four or five seconds but this time is ordinarily sufficient to enable the operator to make the necessary corrective adjustments. In making these corrective adjustments the operator may hold or rotate the lamp to different positions, but ordinarily two checking and adjusting operations of the filament in planes at right angles to each other are sufficient in practice.

For a better understanding of the invention, reference may be had to the accompanying drawings forming a part of this application, wherein:

Fig. 1 is a diagrammatic illustration of the method of checking and adjusting the filament of an incandescent lamp during the sealing operation.

Fig. 2 is an enlarged side view of the lamp bulb illustrated in Fig. 1.

Fig. 3 is a side view of a lamp bulb similar to but of a slightly different type from the bulb illustrated in Fig. 2, and Fig. 4 is a diagrammatic view of a modification of the apparatus which may be employed.

Referring to the drawings where like numerals designate similar parts throughout, I have illustrated a mount sealing-in machine or a part thereof as indicated by the numeral 1, this representing the last position of a multiple position rotary sealing machine of standard construction, the blow pipes for heating and fusing the bulb to the mount or stem being indicated by the numeral 2, and the lamp bulb which is being fused being indicated by the numeral 3— a suitable support 4 being provided on the sealing-in machine for the lamp bulbs. The bulb 3 is illustrated as being heated and fused by the blow pipes 2 directing their flames around its neck to fuse the glass stem 5 thereto, the latter carrying a concentrated filament 6 of standard V-shape. The lower or flaring part 7 of the bulb neck, in the sealing and fusing operation, is entirely removed from the bulb, leaving the stem 5 fused or sealed within the bulb to the neck of the bulb and with a glass tube 8 leading into the stem to the interior of the bulb for exhausting the lamp or introducing a gas, or both, the support 4 being provided with a suitable longitudinal recess at the top for the reception of the tube 8. The details of the sealing machine are omitted from the drawings for convenience in illustration.

The operator removes the bulbs 3 from the support 4 of the machine after the stems 5 are fused to the bulb and the skirts or necks 7 caused to drop off. In removing the bulbs from the support 4, she employs a suitable holder or clamping device 9, the latter having a multiplicity of clamps or fingers 10 which are adapted to pass over and yieldingly grip the globular end or top of the bulb 3, the details of the holder being omitted for convenience in illustration. Upon removing each bulb 3 from the support 4 and holding the same in any convenient position, as indicated in Fig. 1, by one hand engaging the holder 9, the operator causes a light source 11 to project, or cause to be formed, in the globular bulb 3, a pair of images 12, these images 12 always assuming a position in alignment with the geometrical center 13 of the bulb 3, and by observing the relative position of the filament 6 with reference to these images 12, the operator may manipulate the tube 8 with her free hand to adjust the stem 5 and filament 6, either up or down or sidewise to bring the filament 6 in line with and in symmetrical position with respect to these images. The detection of any inaccuracy in filament location and the manipulation of the tube 8 as a corrective, all must take place in a very short time and before the fuse or softened jointure between the stem 5 and the neck of the bulb becomes hardened and set. Usually this hardening or setting takes place within four or five seconds after the bulb 3 is removed from the support 4 opposite the blow pipes 2, but this is ordinarily sufficient time for the operator to remove the bulb, observe the position of the filament 6 with respect to the images 12, and make any adjustment which may be required to center the filaments more accurately. In this centering operation the operator will assume and hold the bulb 3 in a position with respect to the source of light 11 which enables her to obtain the most accurate sightings with the greatest ease and facility; usually she holds the bulb 3 with its longitudinal axis approximately at right angles to the direction from which the light rays come to form the images 12, and ordinarily accurate observations and corrective adjustments may be made with the line of sight from the eye meeting the direction of light approximately at right angles at the filament—however, the positions and angles vary considerably with the individual operators concerned. For the best and most accurate results, it is advisable for the operator to take an observation and adjustment with the lamp assuming a position such as indicated in Fig. 1, and then rotating the lamp on its axis ninety degrees (90°) and making another observation and second adjustment, if necessary, at right angles to the first. Where necessary the operator may then rotate the lamp back to the first position and check the first position and check the first adjustment—all of which may readily take place within the cooling or setting period of the fused jointure. In Fig. 2 the dotted position of the filament mount indicates the off center observed by the operator and by slightly manipulating the tube 8 the mount is adjusted to the position shown wherein the center of the V-shaped filament 6 coincides with the geometrical center 13 of the bulb in line with and half way between the images 12—I have indicated by the letter A a ray or beam of light coming from the source 11 and forming the images 12.

The source of light 11 may be of any convenient form, the one illustrated having been used with good results and consisting of an ordinary incandescent bulb (not illustrated) contained within a cylindrical housing 14 of a suitable opaque material, the latter containing a small opening 15 in line with the incandescent source and the bulb 3 to give a more or less restricted beam directed toward the lamp bulb. Some operators prefer to use a soft, diffused illuminated background for the bulb 3 during the checking and correcting adjustments of the filament, and there is illustrated in the drawing a standard goose-neck lamp reflector 16 with an incandescent lamp therein (not illustrated) and having a front plate covering 17 of diffusing material, such as a suitably colored paper, for giving the desired soft, diffused background, this being placed directly in line with the observer's eye and the bulb 3 and to the rear of the bulb as indicated.

The lamp bulb illustrated in Figs. 1 and 2 is of the tipless type, namely one wherein the globular end or top of the bulb is closed and the exhaust tube 8 is sealed into the stem 5 so as to enable the bulb to be exhausted or gas to be introduced. In Fig. 3 a bulb of the tip type is illustrated wherein the tube 19 is sealed to the top of the bulb after the blowing operation, this tube serving a similar purpose to that of the tube 8 in Figs. 1 and 2. In the checking and corrective adjustments of the filament of this bulb no holding or clamping device 9 is necessary, as the operator may hold the bulb in one hand by means of the exhaust tube 19, similar to the manner in which she grips the holder 9, and she uses the other hand to manipulate the leading-in wires 20 to bring the filament 6' in line with the images 12', the jointure between the stem 5' and the neck of the bulb being so soft as to readily permit adjustments by a very small force applied to the stem through the leading-in wires.

The checking and centering of the filament in the manner set forth has substantially reduced the wastage of lamps due to imperfect filament location, it being found that even the poorest and inexperienced operators are thoroughly capable of accurately adjusting and centering the filaments well within the limits permissible in practice, and resulting moreover not only in fewer unacceptable lamps on account of bad filament location, but also in a greater percentage of lamps having the filament located at the exact geometrical center of the bulb. This more accurate centering of the filaments results in easier and more accurate focal adjustments, with the consequent better and more satisfactory light beams from the headlight reflectors.

In Fig. 4 I have illustrated a slightly modified apparatus for practicing my invention comprising a second source of light 21 adapted to throw a second beam B on the bulb 3 to form a second pair of images 22 angularly displaced from the first pair of images 12. By adjusting the filament 6 to a position symmetrical to both pairs of images simultaneously, it is possible to obtain a more accurate single adjustment. The angle of the line of sight in this case will depend more or less upon the individual operator, but in the drawing the eye 23 is shown sighting to the bulb more nearly in line with the beam B than beam A.

I claim:

1. The method of checking filament location in lamp bulbs which consists in exposing the bulb to the rays of light from a suitable external light source to form testing images of the light source therein and observing the relative positions of the filament and the images thus formed in the bulb.

2. The method of checking filament location in globular lamp bulbs which consists in exposing the bulb to the restricted beam of light from a suitable light source to form a pair of images of said source therein in line with the geometrical center of the bulb and observing the position of the filament relatively to the two images formed in the globular bulb of the light source.

3. The method of precisely locating a filament in a lamp bulb during the sealing in process which consists in locating the filament with reference to images formed in the lamp by the rays of light from a suitable light source.

4. The method of locating a filament in an electric incandescent lamp bulb while the filament support seal is soft which consists in locating the filament symmetrically with reference to a pair of images formed in the bulb by the rays of light from a suitable external light source.

5. The method of precisely locating a filament in a globular lamp bulb during the sealing in process which consists in locating the filament symmetrically with reference to a pair of images formed in the lamp by the rays from a suitable external light source.

6. The method of locating a filament in an electric incandescent lamp bulb while the filament support seal is soft which consists in locating the filament symmetrically with reference to and in line with a pair of images formed in the bulb by the rays of a restricted beam of light from a suitable light source.

7. The method of locating a filament in the center of a globular lamp bulb while the filament support seal is soft which consists in locating the filament symmetrically with reference to and in line with a pair of images formed in the bulb by the rays of a restricted beam of light from a suitable light source.

8. The method of checking the filament location in an electric incandescent lamp bulb which consists in exposing the bulb to the rays of light from a suitable external light source to form testing images therein, and with a diffused illuminated background for the bulb, observing the relative positions of the filament and the images formed in the bulb by the rays from the light source.

In testimony whereof, I have signed my name to this specification.

GEORGE ADAM BODEM.